Patented Aug. 22, 1944

2,356,254

UNITED STATES PATENT OFFICE 2,356,254

PROCESS FOR PREVENTING AND/OR REMOVING ACCUMULATION OF SOLID MATTER IN OIL WELLS, PIPELINES, AND FLOW LINES

Sears Lehmann, Jr., University City, and Charles M. Blair, Jr., Webster Groves, Mo., assignors to Petrolite Corporation, Ltd., Wilmington, Del., a corporation of Delaware No Drawing. Application October 21, 1942, Serial No. 462,885

5 Claims. (Cl. 252—8.55)

This invention relates to a process for increasing and enhancing the operativeness of oil wells, pipelines, and flow lines, and is characterized by the use of a novel treating agent for preventing and/or removing the accumulation of solid matter in oil wells, pipelines, and flow lines.

In many oil wells in which a liquid consisting of oil or a mixture of oil and water or brine is produced, deposits of paraffin wax, asphalt, sand, insoluble alkaline earth compounds and other solid materials collect in objectionable quantities on the well tubing, on the casing, on the inside of the strainer and in the working barrel of the well pump, thereby causing the production of the oil well to be materially decreased. Some or all of these materials also accumulate in oil lines or conduits through which liquids of the kind mentioned travel, such, for example, as surface lines connected to wells, and pipe lines through which oil is transported from oil fields. The presence of these deposits of solid material necessitates cleaning out the wells and the oil lines at more or less frequent intervals, in order to maintain production of wells and capacity of flow lines or pipe lines.

Accumulations may consist of other materials, such as carbonates, silicates, sulfides, silts, salts, etc. In some cases, where such substances are largely inorganic in nature, there may be present wax or a similar substance which may serve as a matrix or binder to hold the substances together in coherent mass. Sometimes the accumulation is due, in part, to the formation of iron oxide or scale on the working parts of the well, and particularly in the tubing. Sometimes such accumulations are due to the mud sheath which was formed during the drilling process. Much the same material which tends to accumulate in and reduce the throughput of oil wells, i. e., the vertical conduits of the well, likewise reduce and hinder the operativeness of flow lines and pipelines.

It may be well to point out that the present invention is concerned with the removal of such residual mud sheaths above mentioned from the surface or face of the well, as differentiated from the removal of the infiltrated mud sheath from the oil-bearing strata which surrounds a well. As to the removal of such residual mud sheaths from the oil-bearing strata surrounding the well, reference is made to our copending application Serial No. 462,884, filed October 21, 1942.

The reason for removing such accumulation is, of course, obvious. Numerous procedures have been proposed, some of which are better adapted for perhaps one type of accumulation, as differentiated from another type. In this connection attention is directed to the following patents: U. S. Patent No. 1,513,371, dated Oct. 28, 1924, to Campbell; 1,754,296, dated April 15, 1930, to Ackerman; 1,861,176, dated May 31, 1932, to De Groote; 1,886,008, dated Nov. 1, 1932, to Gorman; 2,135,909, dated Nov. 8, 1938, to Monson; and 2,139,595, dated Dec. 6, 1938, to Larch et al.

In the introduction of a solvent or a dispersant intended to remove such accumulation, the general procedure is to use conventional means of introduction. Sometimes the procedure employed is the same as that used to introduce a chemical demulsifying agent, either into a flow line or into a well. The usual means is to employ a lubricator in which pressure is equalized with the rock pressure or flowline pressure, or to use a pump in which sufficient pressure is employed to inject a selected treating fluid in the flow line or well.

Briefly stated, our process consists in introducing into a well, flowline, or pipeline, a treating agent which we have termed a transparent emulsion, in view of the terminology already employed in the art. The means for injecting said treating agent into the well, flowline, or pipeline, is that commonly employed in connection with somewhat similar materials of the kind described in the aforementioned patents.

The transparent emulsions employed as the treating agent of our hereindescribed process, are described in complete detail in our co-pending application, Serial No. 462,883, filed October 21, 1942, which application is concerned with the use of such transparent emulsions for any and all the purposes broadly, for which paraffin wax solvents are commonly employed. Thus, the present invention may be considered as a highly specialized and particularly valuable adaptation of the subject-matter broadly described and claimed in our aforementioned co-pending application. What is said hereinafter as to the composition of said transparent emulsions is in substantially the same verbatim form, as such description is found in the aforementioned co-pending application. The paraffin waxes may be considered as typical members of the class of non-polar substances, which are essentially hydrocarbon in nature, and are soluble in non-polar solvents, as distinguished from polar solvents, or semi-polar solvents. Since the words "polar," "non-polar" and "semi-polar" have been used at times in different senses, attention is directed to the fact that their usage in the present instance conforms to that which is found in "Industrial Chemistry of Colloidal and Amorphous Material," page 15, Lewis, Squires & Braughton, and in "Organic Chemistry," page 30, Cheronis.

It it well known that a variety of organic solvents are effective paraffin wax solvents, and are commonly used in commerce for such purposes. Such solvents for paraffin wax include benzene, xylene, turpentine, carbon tetrachloride, carbon bisulfide, monochlorbenzene, trichlorethylene, chloroform, kerosene, and various other chlorinated hydrocarbons. Such materials are used to prepare solutions of paraffin or the like subsequently employed as water-proofing agents, polishes, or for the removal of paraffin wax in cleansing or similar operations. The most effective solvent for wax or materials of the kind previously mentioned, is carbon bisulfide. The use of carbon bisulfide involves a number of hazards, both from the standpoint of fire risk and industrial poisoning, and as far as convenient, chlorinated hydrocarbons are substituted wherever possible. The second best paraffin solvent is usually carbon tetrachloride. Other solvents, such as those previously enumerated, are characterized by the fact that their solvent power is at least one-third as good as carbon tetrachloride, when measured under the same conditions. Reference hereinafter to a hydrocarbon solvent or a paraffin wax solvent, or, in a broader sense, a solvent for non-polar solids and semi-solids of the kind previously described, is intended to mean those solvents whose solvent action is at least one-third as good as carbon tetrachloride at normal temperatures, for example, 20–25° C., under the same comparable conditions.

Paraffin wax solvents, as ordinarily available, are subject to certain limitations. For example, they are apt to be expensive. They may involve considerable fire hazard, and in some instances, they may involve a pronounced industrial poisoning hazard. They do not mix with water, even though this is sometimes a desirable property. The reason they do not mix with water is that their characteristic property is the ability to dissolve a non-polar substance. Since like dissolves like, it is apparent that the above mentioned solvents are essentially non-polar, whereas, water is essentially the ideal polar solvent. Under such circumstances, the solvents above indicated are water-insoluble. If, however, such paraffin solvents are used to remove paraffin from the subterranean strata of an oil well where water is also present, it is obvious that the mere presence of water acts as an impervious and impenetrable film or layer that prevents effective solvent action. Furthermore, the ordinary paraffin solvent tends to act almost entirely by the mere solution of the paraffin or paraffinoid substance. When such solution after use is removed, it means that there will remain behind a slight amount of paraffin solvent, in which some paraffin or similar wax is dissolved. As the solvent evaporates, a film of wax will still remain, although the original intention involving the use of such a solvent may have been to obtain a wax-free, water-wettable surface. In such instances, the compositions of the kind herein described have desirable properties, which are not inherent in the paraffin solvents per se.

It is well known that if an ordinary paraffin wax solvent, as, for example, carbon tetrachloride, is mixed with another solvent that is not a particularly effective paraffin wax solvent, and which would not ordinarily be so considered, as, for example, acetone, then such mixture, i. e., a carbon tetrachloride-acetone mixture, is a comparatively poor, and indeed, almost worthless solvent for paraffin wax. In other words, it is a common characteristic of the conventional wax solvents that their effectiveness as a solvent disappears with the addition of substantially any other miscible solvent per se does not have a marked solvent capacity for paraffin wax. In view of this fact, one would expect that the addition of water to a paraffin solvent, if it were physically possible, would act the same as the addition of acetone to carbon tetrachloride, i. e., greatly diminish or completely destroy the solvent property for paraffin wax.

If, however, by the use of other ingredients, one produces a homogeneous solution of conventional paraffin wax solvents and water, and particularly mixtures of the type containing at least 15%, but usually more than 40% of water, and in some instances, as much as 90% water, it is rather unexpected to discover that such composition has pronounced, and indeed, very marked solvent capacity for paraffin wax. Even more remarkable is the fact that the water or aqueous vehicle present may contain inorganic salts or alkalies in rather marked concentration, without lowering or detracting from the solvent power in regard to paraffin wax.

The present process is concerned with the use of such homogentous mixture for removal or dispersal of objectionable matter occurring in pipelines and the like. Such homogeneous mixtures or solutions containing conventional paraffin solvents and water are a special species of a type of material sometimes referred to as micellar solutions or "transparent emulsions." "Transparent emulsions" is the name applied in the arts to mixtures in which a water-insoluble solvent that need not necessarily be a paraffin wax solvent, is admixed with a solution of a wetting agent or the like in water or a brine, in the presence of a common or mutual solvent so as to give a homogeneous mixture. Characterizing such mixtures as "transparent emulsions" is a misnomer, for the reason that they are not emulsions at all. An emulsion, by definition, is an apparently homogeneous mixture of two immiscible liquids. The homogeneity of an emulsion disappears when subjected to microscopic examination, as compared with the naked eye. An emulsion is essentially a heterogeneous system. "Transparent emulsions," as employed in the art, represent true solutions or sols which are not only homogeneous to the naked eye, but also homogeneous to the microscope. They have been referred to as "transparent emulsions," possibly for the reason that one would expect the compounds to produce an emulsion, rather than a microscopically homogeneous mixture, or else, possibly, because there is some confusion, in that certain colloidal sols which are microscopically homogeneous are referred to as emulsoid type sols. Another explation may be that in certain arts, for instance, in the application of agricultural sprays, there are employed certain mixtures, the majority of which are true emulsions, and some of which, although of substantially the same composition, are homogeneous sols of the so-called transparent emulsion type. It may have been convenient to characterize all such mixtures as "emulsions," and then, perhaps improperly, refer to the transparent mixtures as "transparent emulsions."

These true solutions, or at least true sols, as differentiated from scientifically properly characterized emulsions, must not be confused with laboratory curiosities which are really transparent and which are really emulsions. For example, see "Laboratory Manual of Colloid Chemistry," by Holmes, page 63.

However, for purposes of convenience, and in order not to add further confusion to nomenclature which is already in use, we will herein refer to these microscopically homogeneous sols or solutions as "transparent emulsions," because such language is already adopted in the art. For example, see U. S. Patent No. 2,289,536, dated July 14, 1942, to Bradley.

In view of what has been said, and in view of the general knowledge as to the manufacture of transparent emulsions, broadly, it is unnecessary to give any specific directions, except that, generally speaking, the transparent emulsions herein contemplated for use as paraffin wax solvents, are characterized by the presence of at least 15% water or an aqueous vehicle consisting of water in which there is dissolved salts, alkalies, or acids.

At this point it may be well to indicate that the transparent emulsions employed in the process herein described, include not only those described in the literature, which fall within the specifications or descriptions hereinafter indicated, but also include the type or types in which the wetting agent employed is a cation-active material or a material of the non-dissociated type. So far as we are aware, this latter type or types is or are broadly new and are claimed as new compositions of matter in our co-pending application Serial No. 462,886, filed October 21, 1942, previously referred to. Thus, the following description of the transparent emulsions employed in the present process, includes not only types which are well known, but also the additional types above referred to.

The wetting agents which may be used in preparing the transparent emulsions employed in the herein described procedure, may be either cation-active, anion-active, or of the non-electrolytic type. Wetting agents generally have present at least one radical containing 10 or more carbon atoms and not more than 64 carbon atoms, per molecule. This is true of the wetting agents employed in the present instance as a component of the vehicle or solvent or dispersant employed in our present process. The hydrophobe portions of these wetting agents may be aliphatic, alicyclic, alkylalicyclic, aromatic, arylalkyl, or alkylaromatic. The preferred type of wetting agents are those in which the molecule contains a long uninterrupted carbon chain containing from 10 to 22 carbon atoms in length. Examples of suitable anion-active wetting agents include the common soaps, as well as materials such as sodium cetyl sulfate, ammonium lauryl sulfonate, ammonium di-isopropyl naphthalene sulfonate, sodium oleyl glyceryl sulfate, mahogany and green sulfonates from petroleum or petroleum fractions or extracts, sodium stearamidoethyl sulfonate, dioctyl sodium sulfosuccinate, sodium naphthenate, and the like. As to other suitable sulfonates, see U. S. Patent No. 2,278,171, dated February 17, 1942, to De Groote and Keiser.

Suitable cation-active compounds include cetyl pyridinium chloride, stearamidoethyl pyrinidium chloride, trimethyl-heptadecyl ammonium chloride, dimethyl-pentadecyl sulfonium bromide, octadecylamine acetate, 2-heptadecyl-3-diethylene diamino-imidazoline diacetate, etc.

Suitable non-electrolytic wetting agents include the oleic acid ester of nonaethylene glycol, diglycol laurate, etc.

Previous reference has been made to three types of surface-active compounds. It is, of course, well known that surface-active compounds are available, or can be readily prepared, which exhibit the characteristics of more than one of the above mentioned types. For instance, reference is made to the type of materials described in U. S. Patent No. 2,262,743, dated November 11, 1941, to De Groote, Keiser and Blair. For convenience, in such instances where a surface-active material may show the characteristics of more than one of the above described types, it is understood that it may be classified under either or both types for the present purpose.

The mutual solvent or solubilizer components of the treating solutions or transparent emulsions employed in the present process are characterizable as compounds composed of a hydrophobic hydrocarbon residue of comparatively low molecular weight combined with a hydrophilic group of low molecular weight and are free from surface-active properties. For convenience, a surface-active substance is one which in comparatively small amounts, for instance, less than 0.1%, will enormously lower the surface tension of water and produce a coherent and persistent foam. The hydrophobic residue may contain from 2 to 12 carbon atoms and may be alkyl, alicyclic, aromatic, or alkyl substituted alicyclic or aromatic, or may be the hydrocarbon portion of a heterocyclic or hydrocarbon substituted heterocyclic group. The hydrocarbon residue may have branched or normal chain structure, but no branch may have a length of more than 7 carbon atoms from the point of attachment to the hydrophilic residue, counting a benzene or cyclohexyl group as being equivalent in length to an aliphatic chain of three carbon atoms. Where the hydrocarbon residue consists of not more than four carbon atoms, structures of the normal primary alkyl type are preferred. Where the residue is made up of more than four carbon atoms, then structures of secondary and tertiary types are also good where the second and third branches may be methyl or ethyl groups.

This hydrophobe hydrocarbon residue is combined either directly or indirectly with a hydrophilic group of one of the following sorts:
(a) A hydroxyl group which may be alcoholic, phenolic, or carboxylic;
(b) An aldehyde group;
(c) A carboxy amide group;
(d) An amine salt group;
(e) An amine group;
(f) An alkali phenolate group.

By "indirectly combined with one of these groups" is meant that the hydrocarbon residue is combined—as by etherification, esterification, or amidification, etc.—with another organic residue which contains not more than 4 carbon atoms and also one or more of the hydrophilic groups named above, provided that after said combination one at least of the hydrophile groups is left still free. Specific examples illustrating this class of compounds are: Ethyl alcohol, n-amyl alcohol, alpha-terpineol, p-cresol, cyclohexanol, n-butyraldehyde, n-butyric acid, glycol butyrate, propyl lactate, mono n-butyl amine hydrochloride, n-propinionamide, ethylene glycol mono n-butyl ether, and pyridine, methylated pyridine, piperidine, or methylated piperidines.

The solubilizer (common solvent or hydrotropic compound above described) is essentially a semi-polar liquid in the sense that any liquid whose polar character is no greater than that of ethyl alcohol and which shows at least some tendency to dissolve in water, or have water dissolved in it, is properly designated as semi-polar. This is consistent with the previous description and the two references pertaining thereto. Stated another way, the solubilizer or semi-polar liquid indicated may be illustrated by the formula X—Z, in which X is a radical having 2–12 carbon atoms, and which may be alkyl, alicyclic, aromatic, alkylalicyclic, alkylaryl, arylalkyl, or alicyclicalkyl in nature, and may furthermore, include heterocyclic compounds and substituted heterocyclic compounds. There is the added limitation that the longest carbon atom chain shell be less than eight carbon atoms, and that, in such characterization, cyclic carbon atoms shall be counted as one-half.

Z represents

—OH

—NH$_2$

—COOH

—OMe if X is an aryl radical. (Me is an alkali metal atom);

if X is a cyclic tertiary amine nucleus;

if X is a cyclic secondary amine nucleus, or the semi-polar liquid may be indicated by the following formula: —X—Y—R—(Z)$_n$. Here X and Z have their previous significance. R is —CH$_2$—, —C$_2$H$_4$—, —C$_3$H$_5$—, —C$_3$H$_6$—, or —C$_2$H$_4$—O—C$_2$H$_4$— and $n$ is either one or two as the choice of R demands. Y is one of the following

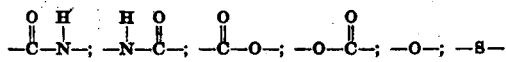

In general, these solubilizers are liquids having dielectric constant values between 6 and 26, and have at least one polar group containing one or more atoms of oxygen and/or nitrogen.

It, perhaps, is significant that all of the solubilizers, with the possible exception of the alkali phenolates, are of types known to be able to form hydrogen bonds.

There are certain obvious limitations imposed by fundamental chemistry in the selection of the semi-polar component which does not require elaboration. For instance, if the semi-polar component contains a free carboxyl, then the presence of an alkali in the polar component, i. e., the aqueous vehicle, would destroy the carboxyl radical. In most instances, this would be extremely objectionable. If an acid were present in the polar component, i. e., the aqueous vehicle, then such acid would, of course, decompose an alkali phenolate.

It is, of course, obvious that the reference to an amine salt group and an amine group is a difference of definition or degree, rather than a difference in kind. Actually, an amine, in the presence of water, probably combines with the water to give an ammonium base. Such an ammonium base may be considered as the salt derived from the water, considered in the light of an acid. This is illustrated by the following:

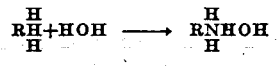

where X' is an anion.

The choice of solubilizer or common solvent and its proportion in the mixture depends somewhat upon the wetting agent used, the amount and kind of oil used, and the proportion of water used, and is best determined by preparing experimental mixtures on a small scale. Various representative formulae will be given later.

The non-polar solvents which may be used in preparing the solvents employed in our process are the liquid, water-insoluble hydrocarbons, halogenated, and more especially, chlorinated hydrocarbons, and carbon disulfide, and preferably, those which have high solvent power for paraffin wax. Examples of suitable oils are: Kerosene, gasoline, benzol, chlorobenzene, carbon tetrachloride, trichlorethylene, carbon disulfide methyl iodide, dichlorethane, bromobenzene, xylene, turpentine, pressure distillate, amylene dichloride, gas oil, various petroleum fraction extracts, and the like. Crude petroleum may be used in some instances.

In some cases it is desirable to include in the solvents small amounts of acid, alkali, or inorganic salts, as it has been found that the presence of these electrolytes often gives solutions having a wider range of miscibility with water and organic materials. The examples below include some solvents containing such ingredients. Excess acid, when used, will, in general, be in solutions containing a cation-active or non-electrolytic wetting agent. Excess alkali, when used, will usually be in a solution containing anion-active wetting agents.

*Example 1*

| | Per cent |
|---|---|
| Sodium oleate | 14.5 |
| n-Butanol | 11.5 |
| Xylene | 52.7 |
| NaCl | 0.3 |
| Na$_2$CO$_3$ | 0.5 |
| Water | 20.5 |
| | 100.0 |

*Example 2*

| | Per cent |
|---|---|
| Sodium oleate | 16.0 |
| n-Butanol | 8.9 |
| Kerosene (non-aromatic) | 51.5 |
| Na$_2$CO$_3$ | 1.6 |
| Water | 22.0 |
| | 100.0 |

Example 3

| | Per cent |
|---|---|
| Green petroleum sulfonate (ammonium salt) | 17.2 |
| Sodium oleate | 8.6 |
| Alpha-terpineol | 8.1 |
| Kerosene (non-aromatic) | 40.3 |
| Water | 25.8 |
| | 100.0 |

Example 4

| | Per cent |
|---|---|
| Sodium oleate | 4.8 |
| $CCl_4$ | 43.0 |
| Ethylene glycol mono-butyl ether | 4.1 |
| NaOH | 0.5 |
| Water | 47.6 |
| | 100.0 |

Example 5

| | Per cent |
|---|---|
| Green petroleum sulfonate (ammonium salt) | 14.5 |
| Sodium oleate | 10.4 |
| Rosin oil | 10.4 |
| Kerosene (non-aromatic) | 48.0 |
| Water | 16.7 |
| | 100.0 |

Example 6

| | Per cent |
|---|---|
| Sodium oleate | 8.5 |
| Sulfonated sperm oil ($NH_4OH$ neutralized) | 1.0 |
| n-Butyl alcohol | 4.6 |
| Destructively distilled turpentine | 12.4 |
| Aromatic kerosene | 13.8 |
| Carbon tetrachloride | 9.3 |
| Water | 49.9 |
| Sodium hydroxide | 0.5 |
| | 100.0 |

Example 7

| | Per cent |
|---|---|
| Hexadecylamine acetate | 10.0 |
| n-Butanol | 18.0 |
| Kerosene (non-aromatic) | 34.0 |
| Water | 38.0 |
| | 100.0 |

Example 8

| | Per cent |
|---|---|
| 2-heptadecyl-3-diethylene diamino-imidazoline diacetate | 12.0 |
| Alpha-terpineol | 7.0 |
| Kerosene (non-aromatic) | 14.0 |
| Water | 67.0 |
| | 100.0 |

Example 9

| | Per cent |
|---|---|
| Octadecylamine hydrochloride | 9.0 |
| Ethylene glycol mono-butyl ether | 27.0 |
| Benzene | 27.0 |
| Water | 37.0 |
| | 100.0 |

Example 10

| | Per cent |
|---|---|
| Nonaethylene glycol mono-oleate | 11.7 |
| 95% ethyl alcohol | 8.8 |
| $CCl_4$ | 34.3 |
| Aqueous HCl (10% HCl by weight) | 45.2 |
| | 100.0 |

Example 11

| | Per cent |
|---|---|
| Sodium oleate (anhydrous) | 2.86 |
| n-Propyl alcohol (anhydrous) | 2.48 |
| $CCl_4$ | 19.75 |
| Water | 71.68 |
| NaOH | 0.16 |
| Na Hexametaphosphate | 3.07 |
| | 100.00 |

Example 12

| | | |
|---|---|---|
| Oleic acid | ml | 5 |
| n-Butylamine | ml | 5 |
| Benzene | ml | 20 |
| 11.1% aqueous NaOH solution | ml | 11 |
| Water | ml | 50 |

Example 13

| | | |
|---|---|---|
| Lauric acid | ml | 5 |
| p-Cresol | ml | 5 |
| Kerosene | ml | 20 |
| Aqueous ammonia (4.7% $NH_3$) | ml | 15 |
| 15% aqueous $NH_4Cl$ solution | ml | 3.5 |
| Water | ml | 80 |

Example 14

| | | |
|---|---|---|
| 2-heptadecyl-3-triethylenetriamino-imidazoline | ml | 5 |
| n-Butyraldehyde | ml | 5 |
| $CCl_4$ | ml | 20 |
| 10% aqueous acetic acid solution | ml | 25 |
| 16% aqueous NaCl solution | ml | 0.5 |
| Water | ml | 20 |

Example 15

| | | |
|---|---|---|
| 2-heptadecyl-3-triethylenetriamino-imidazoline | ml | 5 |
| Phenol | ml | 5 |
| $CCl_4$ | ml | 20 |
| 10% aqueous acetic acid solution | ml | 15 |
| 16% aqueous NaCl solution | ml | 1.5 |
| Water | ml | 45 |

Example 16

| | | |
|---|---|---|
| 2-heptadecyl-3-triethylenetriamino-imidazoline | ml | 5 |
| n-butyric acid | ml | 5 |
| $CCl_4$ | ml | 20 |
| 10% aqueous HCl solution | ml | 15 |
| 16% aqueous NaCl solution | ml | 7 |
| Water | ml | 45 |

The above percentages are by weight.

It may be well to point out that in the above examples one is not limited to a single type of ingredient. For instance, the non-polar solvent used may be a mixture of two or more different solvents, as, for example, a mixture of benzene and kerosene. Similarly, the common solvent may represent a mixture, as, for example, a mixture of ethyl alcohol and ethylene glycol mono-butyl ether. Likewise, the aqueous phase may consist of a solution of more than one electrolyte, for example, a mixture of caustic soda and sodium hexametaphosphate. Similarly, the wetting agent may represent a mixture, as, for example, a mixture of octaethylene glycol mono-oleate and decaethylene glycol mono-oleate.

In view of the well known art on the subject (see "Advances in Colloid Science," 1942, page 99; and also Journal of Physical Chemistry, volume 43, page 495), it is well understood that one could not necessarily employ any or all of the above mentioned components in any or all combinations, and invariably and inevitably obtain a transparent emulsion. All the components indicated can be used satisfactorily in conjunction with various of the other components within definite proportions and limitations to give suitably transparent emulsions. Such statement is entirely consistent with the available technical knowledge in regard to these peculiar combinations.

Certain limitations in forming the transparent emulsions or micellar solutions are apparent and have been previously suggested. For instance, one would not use sodium oleate in the presence of an acid. One would not employ an alkaline phenolate in the presence of acid. Likewise, one would not ordinarily mix a cation-active wetting agent and an anion-active wetting agent. Furthermore, if an acid is present in any appreciable amount, one would probably use a cation-active wetting agent.

As to the non-polar solvents, it is obvious that they are chemically inert for all practical purposes and that there is little to choose from in the particular selection, except to the degree that they are effective paraffin solvents and ease of homogenization. As previously pointed out, carbon bisulfide is most effective; carbon tetrachloride and the like is second; and other solvents come next.

The hydrocarbons yield homogeneous emulsions possibly with greater ease than carbon bisulfide or the chlorinated hydrocarbons. The difference, in a general way, is not great. Briefly, then, the selection of the non-polar solvent is not apt to be critical, although the amount which may be introduced in a particular combination may vary to a marked degree. The common solubilizer shows greater variation than the non-polar solvent, although it too is chemically inert; and as previously indicated, the most suitable types are those showing maximum semi-polarity, that is, the type that begins to approach n-butanol, alpha-terpineol, ethylene glycol mono-ethyl ether, n-propyl alcohol pyridine, or ethanol. Carbon bisulfide is homogenized most readily if used in conjunction with normal butanol. See U. S. Patent No. 1,900,981, dated March 14, 1933, to Dolmaier. As to the polar component, water may be employed almost without exception; but in many cases, translucent products, or those which are on the verge of being satisfactory, become homogeneous on the addition of an electrolyte. Furthermore, where water gives a perfectly satisfactory emulsion, it is sometimes desirable to increase the aqueous component; and when this is done, not infrequently one runs into difficulties, unless an electrolyte is added. The electrolyte may or may not be inert.

Thus, it is obvious that on a broadly comparative basis, there is not a great deal of difference between the various non-polar solvents; and there is not a great deal of difference between the common solvents within the scope indicated; and this also applies to the aqueous component. There is, however, considerable difference in the suitability of any particular wetting agent. This is the component whose behavior is least predictable and whose selection, in a particular transparent emulsion, requires greater care, for the reason that there is such a wide variety of wetting agents. Furthermore, it is the nature of the wetting agent, which, to a marked degree, determines the final combination or combinations, that will yield satisfactory transparent emulsions. The emulsions which can be satisfactorily prepared from some wetting agents, for instance, from green acid sulfonates derived from petroleum, are very limited in scope; whereas, other wetting agents, such as sodium oleate, appear to be suitable under practically any combination and in connection with a wide variety of individual ingredients. Accordingly, one may conveniently resort to experimental procedure which will roughly determine the nature of any particular wetting agent which is contemplated for use.

This experimental procedure is as follows:

The contemplated wetting agent is purified, and particularly so as to remove any inorganic electrolytes. A sufficient amount of the wetting agent is weighed out so as to equal 6 grams of the wetting agent on an anhydrous basis. 7 cc. of the solubilizer are added and intimately mixed with the wetting agent. 20 cc. of water are then added. Many types of wetting agents, for instance, ammonium oleate, become partially hydrolyzed in the aqueous solution. Thus, it is well to suppress the hydrolysis by addition of an appropriate alkali or acid, as the particular case demands. The amount added may represent one-half percent or less, based on the water previously added. If sodium oleate is used as the wetting agent, a half percent of caustic soda may be employed. Not over 20 cc. of the non-polar solvent is added slowly to the mixture previously prepared and stirred constantly; and at the same time the clarity of the resultant mixture is noted. Then more water is added slowly with continual stirring until at least 300 cc. of water have been added and possibly some more. Note that the clarity of the mixture should be observed during the last two stages, i. e., while the non-polar solvent was being added in an amount not in excess of 20 cc. and while the water was being added in an amount at least equal to 300 cc. Somewhere during the course of the addition of the non-polar solvent or the subsequent addition of more water, a clear solution or transparent emulsion is probably obtained. The experiment may be repeated several times; for instance, it is preferable to use carbon tetrachloride as the solvent and n-butanol as the solubilizer during the first experiment. During the second experiment kerosene may be used as a solvent and alpha-terpineol as the solubilizer. During the third experiment the combination of carbon tetrachloride and alpha-terpineol may be used; and in the fourth experiment the combination of kerosene and n-butanol may be used. Similarly, the experiments can be repeated, adding a small amount of electrolyte, for instance, approximately one-half of one percent of caustic soda, to the water which is used in the final dilution step. In any event, such series of experiments will readily indicate one or more proportions which give transparent emulsions, and thus provide a working basis from which one can mechanically or by cut-and-dried procedure, prepare other variations. It is to be noted that the experimental proportions above indicated are not considered as limitations as to the specific composition of the emulsions herein contemplated.

In some instances it may be necessary to repeat experiments at 70° C., or thereabouts, instead of room temperature. In other words, at such elevated temperatures one may obtain a homogeneous mixture, which is not obtainable at room temperature. It may also be desirable to repeat experiments, using a 10% hydrochloric acid solution, by weight, as the aqueous constituent. In some instances, cation-active wetting agents, or similar acid-resistant substances, give homogeneous solutions only in the presence of an acidic component of the kind indicated.

In a large majority of cases, the limit of proportionality between the several components and within the homogeneous systems, cannot be predicted beforehand with mathematical accuracy, but must be determined experimentally. However, having used the experimental procedure previously outlined, one can readily determine at least one region of homogeneity. It is a simple matter to determine the limitations of this particular region by varying the amounts of the component in the customary manner of all such procedure, i. e., hold all other components constant and vary one at a time. This provides an easy experimental exploratory method to determine the limits of any homogeneous region. Further alteration in the extent of the homogeneous region obtained with a given wetting agent may be made by change of solvent or change of solubilizer or by addition of an electrolyte which is compatible with the wetting agent. It is noteworthy that as many mixtures of this type are diluted with water or a solution of an electrolyte, that there appears to be more than one separate and successive region of homogeneity and the one of greater dilution is usually broader and less critical as to composition. That is the one obtained in later stages of dilution. The limits of homogeneity are usually quite sharp and easily determined by mere visual examination. In some cases supersaturated solutions appear to form which break into heterogeneous systems on standing. For this reason, if a combination is selected which appears on the edge of a homogeneity zone, then the particular combination should be allowed to stand for a long enough period of time, for instance, a few hours, or a few days, to insure that it will be permanently stable. Sometimes this change may be due to an equilibrium involving hydrolysis.

Returning momentarily to the experimental procedure previously discussed, it is to be noted that the relative proportion in which the several components of this type of solution may be present may have considerable variation; but a clear soltuion containing 6 g. of wetting agent, 5 g. of solubilizer, 20-30 g. of non-polar solvent, and 20-200 g. of water containing electrolyte in most instances, is apt to give a suitable transparent emulsion on the first trial mixture and also is apt to be one which comes within the limits hereinafter indicated.

What has been said previously, together with what is a matter of common knowledge, is more than ample for a person skilled in the art, by merely cut-and-dried experiment, to predetermine proper proportions of the components in order to obtain transparent emulsions of the kind herein contemplated.

One characteristic of these transparent emulsions, not previously referred to but of importance in many instances, is the fact that they exhibit almost zero interfacial tension towards either oil or water. It is to be noted that this is of particular importance in the present instance.

It may be well at this point to emphasize the fact that the solvent and the dispersant effect of transparent emulsions of the kind previously described is not completely understood.

A brief recapitulation of the general nature of the transparent emulsions herein contemplated appears desirable. As has been pointed out, they comprise three liquid components, one of which is a non-polar solvent whose solubility capacity for paraffinoid substances, such as a medium melting point paraffin wax, must be at least one-third that of carbon tetrachloride, under comparable conditions, plus a semi-polar or hydrotropic common solvent or solubilizer, and an aqueous component, which must be present, at least to the extent of 15% by weight, and consist of the polar substance water, in which there may be dissolved electrolytes, which are, of course, even more polar than the water itself. For convenience, the polar aqueous component will be referred to as having a polarity equal at least to water. This appears entirely proper, in that solutions of an electrolyte in water can be properly considered as having a polarity greater than water in the light of their electrical conductivity. The fourth component, of course, is the wetting agent or agents previously described in detail, suitable in amount and quantity to insure homogeneity of the other components with each other, and jointly with the wetting agent. In connection with the semi-polar component or solubilizer, sometimes referred to as a common solvent, see U. S. Patent No. 2,158,374, dated May 16, 1937, to Merrill; and also the aforementioned Bradley patent.

Attention will now be directed particularly to at least four of the rather significant features of the transparent emulsions intended to be used as the treating agent of our present process. In the first place, the solvent property of the transparent emulsion considered purely as a solvent, is still significant and compares favorably with that which would be expected to be contributed by the non-polar solvent component, in the absence of other components. In other words, one can dissolve a powdered paraffin wax in such transparent emulsions in an amount which is in the same order of magnitude as one would expect if the non-polar solvent constituent were available in the absence of the other component emulsion. Secondly, when a solid wax surface or paraffinoid surface is subjected to contact with a transparent emulsion of the kind herein contemplated, the major portion of the non-polar solvent passes from the transparent emulsion into the wax or paraffinoid substance, and causes it to swell and soften, and instigates initial disruption. This phenomena may be illustrated by comparison with a solution of a paraffin wax solvent in some other medium, as, for example, a straight run aliphatic kerosene or crude oil. Such kerosene or crude oil has little or no solvent action upon medium melting point paraffin wax. If an excellent paraffin solvent, such as carbon tetrachloride, is mixed with such kerosene or crude oil in the proportion of one part of the tetrachloride to four parts of the hydrocarbon, one has a mixture from which paraffin wax will absorb little or no carbon tetrachloride, if intimate contact is obtained under suitable conditions. If, however, one employs a transparent emulsion of the kind herein contemplated containing an equal amount of carbon tetrachloride, it will be found that under identical conditions, a major proportion of the carbon tetrachloride is absorbed by the wax, and such wax-carbon tetrachloride solution is then self-disintegrating in the presence of the remaining constituents of the transparent emulsion. This property is probably concerned with the partition coefficient, adsorption at solid interfaces, etc., but regardless of the basic mechanism or physical chemistry involved, the transparent emulsions, as herein contemplated, exhibit this property in a most useful manner. Thirdly, the wetting agent present, in conjunction with the common solvent or semi-polar liquid, appears to act as a dispersing agent, even in the absence of any marked or vigorous mechanical agitation, although such agitation may be desirable. This characteristic property is of marked value in instances which will be hereinafter referred to. For instance, it is obvious that if a transparent emulsion is forced into a subterranean oil-bearing strata, there is little or no opportunity for agitation in such strata. In other words, ability to remove paraffin wax, under such circumstances, must depend upon some other disruptive force than agitation. The transparent emulsions herein contemplated exhibit such particularly desired property. Fourthly, it may be well to point out that these properties, jointly, or in conjunction with others not mentioned or necessarily understood, permit the removal, for example, of an amount of paraffin wax far in excess of what could be removed by a paraffin solvent of the usual non-polar type. This may be illustrated by reference to the removal of paraffin from a well. If a liquid, such as carbon tetrachloride, is used, it may be that such carbon tetrachloride, at best, could only dissolve 10% of its weight of paraffin wax. The annular space available for the introduction of carbon tetrachloride may be such that the weight of the carbon tetrachloride introduced can be no greater than the wax which is to be removed. Under such circumstances, it might require the use of a number of successive portions of carbon tetrachloride to remove the wax. However, if a transparent emulsion of the kind described herein is employed, then the amount which can be introduced is probably sufficient to cause the complete disruption of the wax and its dispersion into relatively small pieces, or into a slurry, and the entire resultant materials can be removed from the well in a single operation.

As to the limits of the various constituents of the treating agent employed in our process, the following will serve as a guide, the percentage being by weight:

| | Per cent |
|---|---|
| Non-polar hydrocarbon solvent | 5 to 75 |
| Semi-polar mutual solubilizer | 2 to 30 |
| Aqueous component | 15 to 90 |
| Dispersing agent | 2 to 20 |
| Electrolyte | From as little as 0.1 or less to 5 |

Although the exact function of the electrolytes previously referred to is not completely understood, the effect, in part, may be due to the ability to bind water, i. e., become hydrated. This suggests that certain other materials which are highly hydrophile in character and clearly differentiated from the classes of non-polar solvents and semipolar solubilizers may be the functional equivalent of an electrolyte. Substances of this class which ordinarily do not dissociate include glycerol, ethylene glycol, diglycerol, sugar, glucose, sorbitol, mannitol, etc.

In regard to the removal of mud sheaths, it is of interest to know the one method suggested in this connection contemplates the introduction of calcium carbonate, or a similar carbonate, into the drilling mud and subsequent removal of the sheath by means of acid. It is apparent that by employing the acid as an ingredient in a transparent emulsion of the kind herein described, one would have a particularly suitable means for removing such mud sheaths.

In the present instance, it is noted that no effort is made to differentiate between preventing accumulation of objectionable material and removing the same after they have formed. For instance, one might start with a clean well, flowline, or pipeline, and inject material of the kind herein contemplated into the same so as to keep the surfaces clean. In other instances, a well or conduit which was partially obstructed or clogged might be cleaned by the action of a transparent emulsion of the kind contemplated by the present process. After such cleaning process, it might not be economical or feasible to continue to introduce a transparent emulsion so as to continue to keep the conduit or well in a clean and obstruction-free condition. Under other circumstances, such procedure might be feasible. Thus, it might happen that one would clean a well so as to remove the accumulation, and then continue treatment so as to prevent further accumulation. Basically, it is apparent that there is no need to draw any sharp line of demarcation in the present instance between prevention and removal.

It is interesting to note that other examples of the semi-polar liquid used as a common solvent includes:

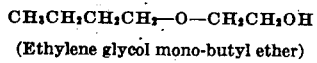

(Ethylene glycol mono-butyl ether)

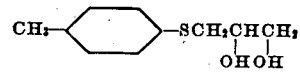

(Glycerol mono-tolyl thio ether)

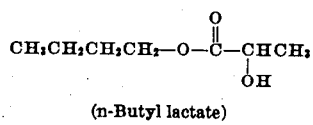

(n-Butyl lactate)

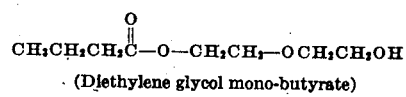

(Diethylene glycol mono-butyrate)

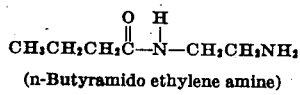

(n-Butyramido ethylene amine)

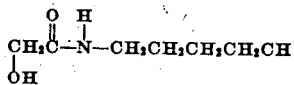

(Glycolic acid n-amyl amide)

Having thus described our invention, what we claim as new and desire to secure by Letters Patent is:

1. In the process of preventing and/or removing accumulation of solid matter in oil wells, pipelines, and flow lines, the step of subjecting surfaces consisting of or containing such objectionable material to the action of a transparent emulsion of predetermined composition, consisting of (a) at least 15% and not over 90%, by weight, of an aqueous polar component whose polarity is at least equal to that of water; (b) at least 5% and not more than 75%, by weight, of a non-polar solvent having a solvent capacity for medium melting point paraffin wax which is at least one-third that of carbon tetrachloride under comparable conditions at normal temperatures; (c) at least 2% and not more than 20% of a water-soluble wetting agent; and (d) at least 2% and not more than 30%, by weight, of an organic semi-polar common solvent of a dielectric constant in excess of 6 and not over 26, the hydrophobic radical of said solvent containing from 2 to 12 carbon atoms with the proviso that the longest carbon atom chain in said hydrophobic radical shall be less than 8 carbon atoms and that in such carbon atom chain length determination, cyclic carbon atoms shall be counted as one-half, and with the added proviso that the addition of a semi-polar common solvent within the limits indicated to the three prior constituents, shall be at least sufficient to render all components mutually soluble.

2. The process of claim 1, wherein the objectionable solid matter is of a waxy nature.

3. The process of claim 1, wherein the objectionable solid matter is of a waxy nature and the wetting agent is anion-active.

4. The process of claim 1, wherein the objectionable solid matter is of a waxy nature and the wetting agent is cation-active.

5. The process of claim 1, wherein the objectionable solid matter is of a waxy nature and the wetting agent is non-dissociated.

SEARS LEHMANN, Jr.
CHARLES M. BLAIR, Jr.